United States Patent Office 3,305,503
Patented Feb. 21, 1967

3,305,503
WAX EXTENDED URETHANE POLYMERS
Donald H. Russell, Pennsauken, N.J., assignor to The Atlantic Refining Company, Philadelphia, Pa., a corporation of Pennsylvania
No Drawing. Filed Nov. 4, 1964, Ser. No. 408,759
7 Claims. (Cl. 260—28.5)

This application is a continuation-in-part of my copending application Serial No. 151,436, filed November 10, 1961.

This invention relates to novel urethane polymer compositions and, more particularly, to wax-extended urethane polymer compositions.

Urethane polymers, also called polyurethanes, are well known in the prior art. They are defined as polymers in which the repeating unit is a urethane linkage. Generally, they are prepared by the addition reaction between organic polyisocyanates (difunctional or higher) and hydroxyl-rich compounds (i.e. containing at least two hydroxyl groups per molecule) such as glycols, polyesters or polyethers, and subsequently curing the resulting product.

Depending on the choice of polyisocyanate, hydroxyl-rich compound and curing agent, the urethane polymer may take the form of plastic or resinous materials, solid foam-like materials or rubber-like materials. The rubber-like urethane polymers are termed "diisocyanate-linked condensation elastomers."

This invention is specifically directed to the rubber-like diisocyanate-linked condensation elastomers. These materials are also known in the prior art as urethane rubbers or simple polyurethanes. A number of methods have been disclosed for the preparation of these types of synthetic rubbers. For example, they have been prepared by heating polyesters, polyesteramides, polyalkylene ether glycols and the like with an organic diisocyanate and thereafter curing the prepolymer to a rubbery material by the use of a curing agent such as water, glycols, amines, diamines, halogenated amines, halogenated diamines, or amine alcohols. (See U.S. Patents 2,625,531, 2,625,532, and 2,692,874.) The diisocyanate-linked condensation elastomers are known by a variety of trademarks including Vulcaprene, Vulcollan, Estane G. Chemigum SL, and Adiprene.

Extended urethane rubber compositions are well known in the prior art. They have been used in the formulation of gasketing material, rubber sheeting, rubber tubing, and in the preparation of floor tile. Typical extenders which have been used include toluene, methyl isobutyl ketone, coal tar pitch, phenolic pitch, amine fatty acid pitch, and aromatic petroleum residues.

While the extenders of the prior art have generally served their desired function, certain disadvantages are attendant on all of the extenders noted above; for example, methyl isobutyl ketone and toluene have a tendency to evaporate from the final composition. The pitch materials were found to slowly react with the urethane and hence would slowly degrade the product. The aromatic petroleum residue, being dark in color, was limited in its usefulness to those compositions in which color was not a factor in the ultimate product.

Extender materials have now been found which eliminate all of the disadvantages attendant on the prior art extenders described above.

It is, therefore, an object of this invention to provide novel rubber urethane polymer compositions.

It is another object of this invention to provide novel wax-extended rubbery urethane polymer compositions.

It is another object of this invention to provide novel wax-extended rubbery urethane polymer compositions in which the extender does not evaporate, will not react with the urethane polymer and can be used wherein a light color is essential or desirable in the final product.

Other objects of this invention will be apparent from the following description and claims.

Broadly stated, the compositions of this invention comprise a cured rubbery urethane polymer, an ethylene-vinyl acetate copolymer and a petroleum wax. These compositions are prepared by mixing together a urethane prepolymer (prepared by condensing a polyester or polyalkylene ether glycol with a diisocyanate), an ethylene-vinyl acetate copolymer, a petroleum wax and a curing agent and thereafter heating the mixture at a temperature ranging between 200° F. and 350° F., preferably 210° F. to 250° F., for a period of time ranging between 1 hour and 5 hours, preferably 2½ to 3½ hours.

The cured rubbery urethane polymers used in this invention are, as stated above, well known in the prior art. They are described thoroughly both in the patented art and the published literature. Generally, they comprise the reaction products of an aliphatic or aromatic diisocyanate with a polyester such as a glycol-adipic acid polyester or a polyalkylene ether glycol having a molecular weight of from about 1,000 to 2,500 cured with a suitable curing agent. Diisocyanates from which rubbery urethane polymers may be prepared include hexylmethyldiisocyanate, 2-nitro-diphenyl-4,4′-diisocyanate, diphenyl sulfone - 4,4′-diisocyanate, naphthalene-1,4-diisocyanate, naphthalene - 1,5-diisocyanate, naphthalene-2,7-diisocyanate, fluorene diisocyanate, and alkylbenzene-2,4-diisocyanates in which the alkyl radical contains from 1 to 24 carbon atoms.

Any of the conventional curing agents may be utilized in this invention in an amount ranging between 10 and 20 weight percent based on the amount of urethane polymer. Examples of suitable curing agents include water, glycols, amines, diamines, amine alcohols, halogenated amines and halogenated diamines.

The extender utilized in this invention is a mixture of ethylene-vinyl acetate copolymer and petroleum wax. This extender may be utilized with a rubbery urethane polymer in amounts ranging up to 60 percent by weight extender in the total composition and preferably in amounts ranging between 20 and 60 percent by weight extender in the total composition. Extender loadings of less than 20 percent may be utilized. However, the advantages gained by using small amounts are normally offset by the cost of incorporating the extender into the polymer.

The ethylene-vinyl acetate copolymers which are utilized in this invention should have a molecular weight of at least 25,000, preferably from 30,000 to 45,000, and a polymerized vinyl acetate content of from 5.0 weight percent to 40.0 weight percent, preferably in excess of 25 weight percent and ranging up to 35 weight percent. These copolymers may be prepared by copolymerizing a mixture of ethylene and vinyl acetate in the presence of a catalyst, such as oxygen or an organic peroxide, for example, t-butyl hydroperoxide, in a tubular reactor at pressures ranging between 15,000 p.s.i.g. and 30,000 p.s.i.g. at a temperature ranging between 150° C. and 250° C. and then separating the resultant copolymer from unreacted monomers by flashing off the unreacted monomers.

The wax component of the extender is utilized in weight ratios between 0.25 and 40 parts wax per one part ethylene-vinyl acetate copolymer. The preferred weight ratio of wax to ethylene-vinyl acetate copolymer ranges between 0.25:1 and 4:1. The most preferred weight ratio is one part wax per one part ethylene-vinyl acetate copolymer. The wax may be a paraffin wax, a microcrystalline wax, or a mixture of paraffin and microcrystalline waxes.

Paraffin waxes are crystalline petroleum products which are removed from distillates or overhead stocks by sweating or solvent separation. These waxes ordinarily have a melting point in the range of 115° F. to 200° F. They are generally agreed to have a plate-like crystalline structure and are relatively hard, brittle and fairly easily fractured. Paraffin waxes are generally obtained from the wax-containing oil distillate fractions and are separated by oil-removal methods such as chilling and subsequent refining operations (e.g. sweating).

Microcrystalline waxes are well known to those in the petroleum art and such products have also been designated as amorphous or petrolatum waxes. They are derived from less volatile and heavier petroleum fractions than are paraffin waxes. The melting point range of microcrystalline waxes is from about 140° F. to 200° F. The available commercial grades vary in hardness and melting point. They are non-crystalline and non-brittle compared to paraffin waxes.

The following examples serve to further illustrate the instant invention.

*Example I*

Various blends of rubbery urethane polymers, ethylene-vinyl acetate copolymers and wax were compounded in accordance with Table I. All amounts shown are in weight percent.

TABLE I

| Sample Number | Adiprene L-100 [1] | Adiprene L-167 [2] | Adiprene LD-213 [3] | MOCA [4] | Wax [5] | Copolymer [6] |
|---|---|---|---|---|---|---|
| 1 | 90 | | | 10 | | |
| 2 | 45 | | | 5 | 50 | |
| 3 | 45 | | | 5 | 25 | 25 |
| 4 | | 90 | | 10 | | |
| 5 | | 45 | | 5 | 50 | |
| 6 | | 45 | | 5 | 25 | 25 |
| 7 | | | 90 | 10 | | |
| 8 | | | 45 | 5 | 50 | |
| 9 | | | 45 | 5 | 25 | 25 |
| 10 | | | 45 | 5 | 49 | 1 |
| 11 | | | 36 | 4 | 30 | 30 |
| 12 | | | 36 | 4 | 12 | 48 |
| 13 | | | 36 | 4 | 48 | 12 |
| 14 | | | 72 | 8 | 16 | 4 |

[1] Trademark of E. I. du Pont de Nemours & Co., Inc. A toluene diisocyanate-polyether condensate having a specific gravity of 1.06, an isocyanate content of 4.0–4.3 percent, a viscosity at 86° F. of 14,000 to 19,000 cps. and a viscosity at 212° F. of 500–600 cps.
[2] Trademark of E. I. du Pont de Nemours & Co., Inc. A toluene diisocyanate-polyether condensate having a specific gravity of 1.06, an isocyanate content of 6.2–6.5 percent, a viscosity at 86° F. of 6,000 to 8,000 cps. and a viscosity at 212° F. of 250–350 cps.
[3] Trademark of E. I. du Pont de Nemours & Co., Inc. A toluene diisocyanate-polyether condensate having a specific gravity of 1.15, an isocyanate content of 9.2–9.5 percent, a viscosity at 86° F. of 12,000 to 18,000 cps. and a viscosity at 212° F. of 300–400 cps.
[4] Trademark of E. I. du Pont de Nemours & Co., Inc. 4,4'-methylene-bis-2-chloroaniline.
[5] Paraffin wax, melting point 145° F.–150° F.
[6] Elvax-250 (manufactured by the Du Pont Company). This material has a molecular weight of about 40,000 and a polymerized vinyl acetate content of about 28 weight percent.

All of the blends described in Table I were cured by heating for 3 hours at 212° F. Upon cooling to room temperature Sample Nos. 2, 5, 8, and 10 separated into two separate phases, namely, a cured urethane rubber and a solid wax phase. The remaining samples were homogeneous.

*Example II*

The homogeneous products produced in Example I were tested for tensile strength, elongation, hardness and abrasion resistance. The results of these tests are shown in Table II.

TABLE II

| Sample Number | Tensile Strength [1] | Elongation [1] | Hardness [2] | Abrasion Index [3] |
|---|---|---|---|---|
| 1 | 5,000 | 550 | 45 | 129 |
| 2 | [4] | | | |
| 3 | 3,000 | 250 | 48 | 110 |
| 4 | 4,800 | 450 | 50 | 230 |
| 5 | [4] | | | |
| 6 | 2,600 | 300 | 52 | 200 |
| 7 | 7,500 | 250 | 78 | 325 |
| 8 | [4] | | | |
| 9 | 4,600 | 100 | 80 | 290 |
| 10 | [4] | | | |
| 11 | 2,600 | 100 | 60 | |
| 12 | 2,800 | 120 | 62 | |
| 13 | 2,750 | 80 | 71 | |
| 14 | 6,300 | 235 | 82 | |

[1] ASTM D-1412.
[2] ASTM D-1706.
[3] ASTM D-1630.
[4] Separates.

From the data shown in Table II, as would be expected when an extender was added to the urethane rubber, the tensile strength and elongation were reduced. Quite unexpectedly the hardness and abrasion resistance of the wax-extended urethane rubbers were not significantly affected. In addition, when the wax-extended compositions were heated at a temperature greater than the melting point of the wax, no "bleeding" was observed.

I claim:

1. An extended rubbery urethane polymer composition consisting essentially of a cured urethane polymer and an extender wherein said extender is present in amounts ranging from 20 to 60 percent by weight in the total composition and is a mixture of petroleum wax and an ethylene-vinyl acetate copolymer having a molecular weight of at least 25,000 and a polymerized vinyl acetate content ranging from 5 to 40 weight percent, and wherein the weight ratio of said wax to said co-polymer ranges from 0.25:1 to 4:1.

2. A composition in accordance with claim 1 wherein the weight ratio of wax to copolymer is 1:1.

3. A composition in accordance with claim 1 wherein the copolymer has a molecular weight ranging from 30,000 to 45,000.

4. A composition in accordance with claim 1 wherein the copolymer has a polymerized vinyl acetate concentration ranging from 25 to 35 weight percent.

5. A composition in accordance with claim 1 wherein the petroleum wax is a microcrystalline wax.

6. A composition in accordance with claim 1 wherein the petroleum wax is a paraffin wax.

7. A composition in accordance with claim 1 wherein the cured urethane polymer is a toluene diisocyanate-polyether condensate.

References Cited by the Examiner

UNITED STATES PATENTS

| | | | |
|---|---|---|---|
| 2,729,618 | 1/1956 | Muller et al. | 260—28 |
| 2,872,430 | 2/1959 | Parker | 260—28.5 |
| 2,999,823 | 9/1961 | Dombrow | 260—859 |
| 3,025,167 | 3/1962 | Butler. | |
| 3,171,825 | 3/1965 | Mark | 260—28 |
| 3,201,359 | | Herrick et al. | 260—28 |
| 3,201,362 | 8/1965 | Mark. | |
| 3,211,701 | 10/1965 | Muller et al. | 260—28 |

MORRIS LIEBMAN, *Primary Examiner.*

B. A. AMERNICK, *Assistant Examiner.*